United States Patent [19]
Davies

[11] 4,292,006
[45] Sep. 29, 1981

[54] MANUFACTURE OF CERAMIC WARE

[75] Inventor: Graham Davies, Stoke-on-Trent, England

[73] Assignee: Service (Engineers) Limited, Stoke-on-Trent, England

[21] Appl. No.: 42,638

[22] Filed: May 25, 1979

[30] Foreign Application Priority Data

May 25, 1978 [GB] United Kingdom ............... 22276/78

[51] Int. Cl.³ ................................................ B23C 3/00
[52] U.S. Cl. .................................. 409/131; 83/356.3; 409/173; 409/184; 409/198
[58] Field of Search ............... 409/131, 132, 173, 184, 409/198, 201, 205, 221, 226; 407/32, 33, 64, 65; 425/267, 459; 83/356.3

[56] References Cited

U.S. PATENT DOCUMENTS 2,657,425 11/1953 Keogh ........................... 425/267 X
3,039,163 6/1962 Elliott ............................ 409/173 X

*Primary Examiner*—Z. R. Bilinsky
*Attorney, Agent, or Firm*—Scrivener, Clarke, Scrivener and Johnson

[57] ABSTRACT

A handle-cutting device comprises a conveyor in the form of a horizontal table arranged to be rotated step-by-step to bring handle holders in turn to a handle-cutting station where the handle is lightly clamped. While the holder is stationary at the handle-cutting station, a rapidly rotating cutter (for example, rotating at 3,000 r.p.m.) having a contoured blade representing the profile of the wall of a cup bowl to which the handle is to be attached is progressively advanced towards the holder to remove surplus clay in thin slices from the handle. The blade is unconfined along those parts of its length which effect the cutting, being mounted on spaced apart supporting portions of a carrier, so that the small pieces of clay sliced away by the blade can escape from the cutter. The device ensures a high degree of conformity of the attaching surface of the handle to its intended configuration.

9 Claims, 3 Drawing Figures

MANUFACTURE OF CERAMIC WARE

In the manufacture of cups, the usual practice is to form the cup bowl and handle separately and to attach them together in the clay state by means of slip. It is important, if one is to obtain reliably a good joint between the handle and the bowl of the cup, that the abutting surface of the bowl and handle are of accurate, complementary configuration.

Handles commonly used for cups are of one of two kinds, "open-type" or "closed-type". By the "open-type" we mean a handle which has two areas of attachment to the cup bowl spaced apart by a portion of the surface of the bowl itself. By the "closed-type" we mean the kind which provides an aperture completely surrounded by the handle into which the user can insert a finger; such a handle has only one area of attachment to the cup. For convenience in this description and the claims, the expression "attaching surface" will be used in the singular in relation to a cup handle to mean the whole of the area of attachment of the handle to the cup bowl, whether the area is continuous, as in the case of closed-type handles, or in two separate parts, as in the case of open-type handles.

Whether a cup handle is moulded from clay or cast from slip, it customarily requires a surplus portion of clay to be detached in such a manner as to provide an attaching surface of complementary configuration to the portion of the cup bowl to which it is to be attached, and various devices with contoured cutters have been used for this purpose. One such device in common use has two cutters which approach from opposite sides of the handle to nip off the surplus clay; another widely used device has one blade to remove the excess clay while the handle is lightly clamped in a two part chuck which provides a cavity of similar profile to that of the handle. While these devices have proved generally satisfactory for most potteries under conditions of manufacture which have hitherto prevailed, trends towards the reduction of skilled hand labour and manual inspection and towards automatic production at increased output have emphasized the need for a higher degree of conformity of the attaching surface of the handle to the complementary surface of the cup bowl if the reliability of attachment of the handles is to be maintained.

It is accordingly one of the various objects of the present invention to provide an improved method of removing surplus clay from a handle in the manufacture of ceramic ware which ensures a high degree of conformity of the attaching surface of the handle to its intended configuration.

It is another of the various objects of the present invention to provide an improved handle-cutting device for carrying out the improved method.

According to the invention there is provided a method of removing from a cup handle surplus clay in such a manner as to provide an attaching surface having a high degree of conformity to its intended shape, wherein a rotating cutter of suitable contour, which as the cutter rotates defines by its arcuate path a shape to which it is desired the attaching surface of the handle shall conform, is advanced laterally relatively towards the handle substantially in the plane thereof in such a manner as to remove the surplus clay progressively in small pieces.

The invention also provides a handle-cutting device comprising a holder with a groove in it to receive and position a handle, the groove terminating at an edge of the holder over which surplus clay of a handle projects in the operation of the device, and a rotatable cutter having a contoured blade arranged to rotate about an axis substantially parallel to the plane of the handle such that the blade defines by its arcuate path a shape to which it is desired the attaching surface of the handle shall conform, the device also comprising means for causing relative lateral movement of approach and separation to take place between the cutter and the holder in the operation of the device so that, in such relative lateral approach, the surplus clay of a handle is removed progressively in thin slices.

There now follows a detailed description, to be read with reference to the accompanying drawings, of a handle-cutting device and method which illustrate the invention by way of example.

Figure 1:
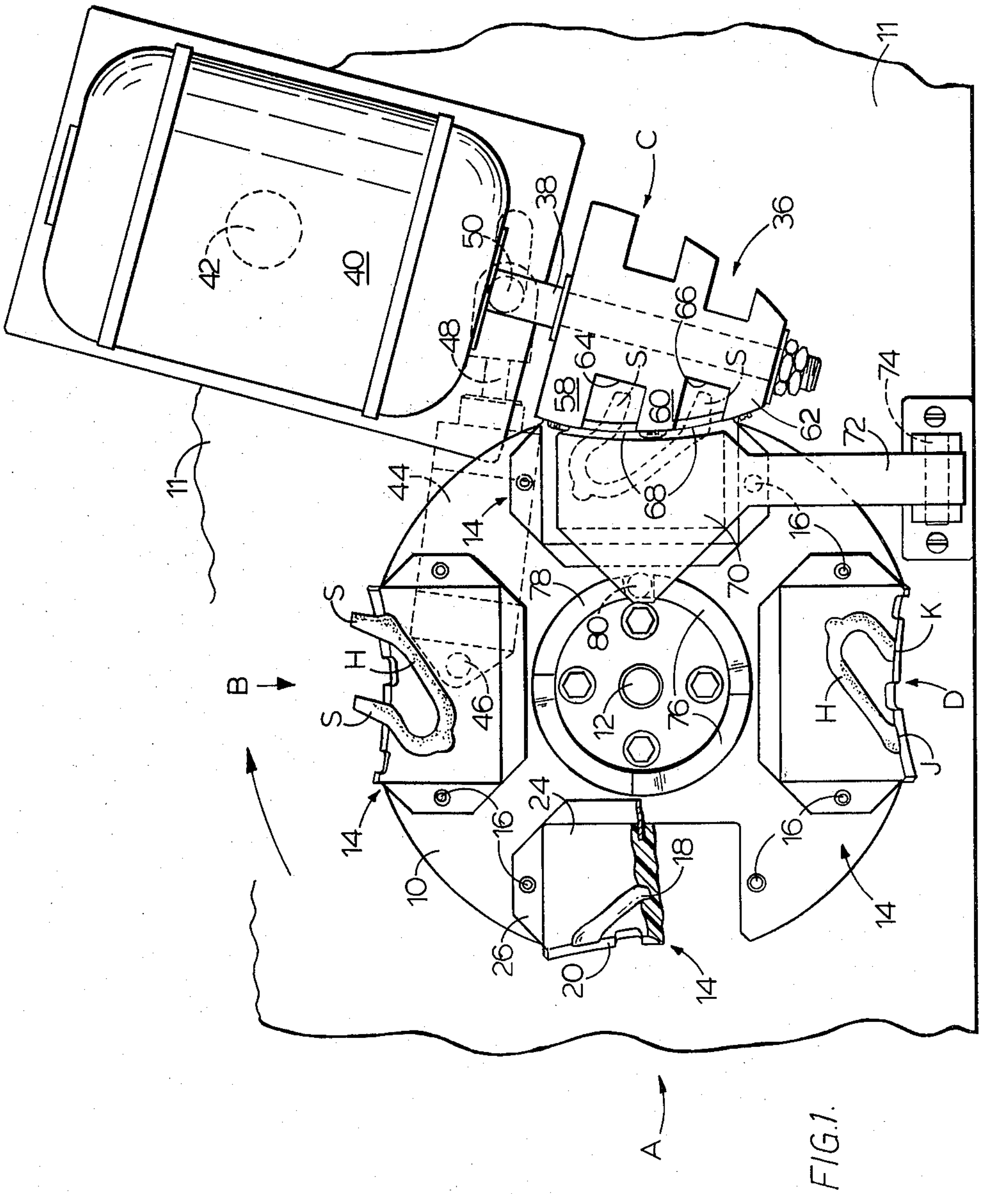
FIG. 1 is a representation in plan view of operative parts of the illustrative handle-cutting device.
Figure 3:
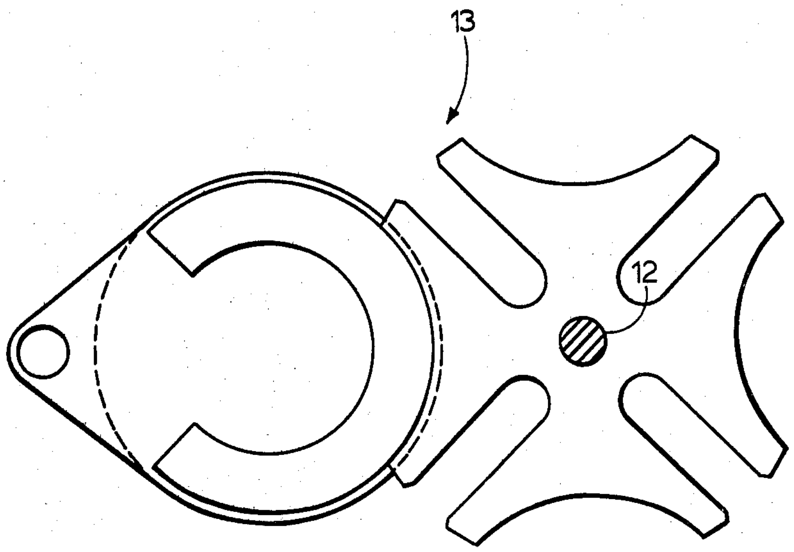
FIG. 3 is a view in plan of a table indexing mechanism.

The illustrative handle-cutting device comprises a rotatable horizontal table 10 (FIG. 1) mounted on a vertical shaft 12 for step-by-step rotation through steps of 90° under control of an indexing mechanism in the form of a geneva mechanism 13 (FIG. 3). The shaft 12 and geneva mechanism 13 are supported by a frame 11 of the machine, the geneva mechanism being mounted beneath the rotatable table 10. The table 10 carries four holders 14, detachably secured to the table by bolts 16. Each holder 14 has a groove 18 shaped to conform to the profile of a cup handle; the ready detachability of the holders enables them to be changed for handles of different shapes. The holders 14 shown in the drawings are for an open-type handle, the groove 18 terminating at each end at an edge 20 of the holder constituted by an arcuate profiled surface. Parts 24 of the holders 14 in which the grooves 18 are formed and including the edges 20 are conveniently moulded in plastics material onto open-sided metal frames 26 through which the bolts 16 pass, as depicted by the sectioned portion of the left-hand holder shown in the drawings, which is at a loading and unloading station A of the illustrative device.

Diametrically across the table from the loading and unloading station of the illustrative device is a handle-cutting station C where surplus material S of the handle H is removed by a cutter 36 in the operation of the device. The cutter 36 is mounted on a horizontal output shaft 38 of an electric motor 40 pivoted on a vertical pin 42 mounted on the frame 11. A pneumatic cylinder 44 is pivoted about a vertical pin 46 on the frame below the table 10, its piston rod 48 being also pivoted at 50 to the motor 40. The motor 40 can thus swing about its pivot 42 under control of the piston (not shown) in the cylinder 44 to move the cutter laterally towards and away from the projecting ends of the handle.

Figure 2:
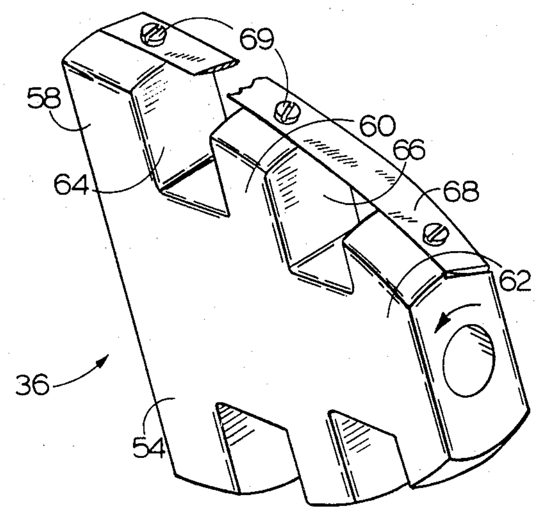
FIG. 2 is a fragmentary perspective view of a cutter of the illustrative device.

The cutter 36 of the illustrative device comprises a blade carrier 54 (FIG. 2) having flat parallel sides and with inner, median and outer radially projecting supporting portions 58, 60 and 62 of progressively diminishing radii respectively. The portions 50, 60, 62 are spaced apart by gaps 64, 66. End faces of the portions 58, 60, 62 are shaped in longitudinal profile (i.e. axially of the carrier) to correspond, in a central diametrical plane, to the longitudinal profile of the bowl of a cup to which handles H are to be attached, thus to support a blade 68 with its cutting edge coincident with said plane. The blade 68 is of a thickness usually associated with razor blades and is flexible enough to assume a contour corresponding to the longitudinal profile of the cup bowl. The blade 68 is unconfined where it bridges the gaps 64, 66, which are disposed opposite the portions S of the handle H which are to be cut off. The blade is attached to the carrier 54 by screws 69.

In the operation of the illustrative device in carrying out the illustrative method a handle H is loaded by hand or automatically into the groove 18 of the holder at the loading and unloading station A, while the cutter 36 is operating on a handle H at the operating station C. Another handle H is already waiting at an intermediate station B (FIG. 1), resting in the groove 18 of the holder with the surplus clay S projecting beyond the edge 20.

When the cutting operation has been completed and the cutter 36 has withdrawn, the motor 40 swinging anticlockwise about its pivot 42 under control of the piston 44, the table 10 rotates one step (either automatically or on manual actuation by the operator, as preferred). The handle 8 that has just been trimmed at station C has been lightly clamped on the holder by a hold-down member in the form of a flat-bottom plate 70 at one end of an arm 72 pivoted on a horizontal pin 74 mounted on the frame 11. The plate 70 rests under the influence of gravity on the handle, its under surface being preferably covered with felt to avoid distorting the handle, but as soon as the table begins to rotate, it is raised by a lobe 76 of an annular cam plate 78 secured to the table co-axially with the shaft 12. A pin 80 depending from the plate 70 engages the lobe. The next handle H is thus brought from station B to station C, whereupon the pin 80 drops over an abrupt edge of the lobe 76 so that the plate 70 lightly clamps the handle on the holder. At the same time, the cylinder 44, actuated by a valve (not shown) triggered by a lug (not shown) on the table 10, permits advance of the piston in the cylinder 44 under the influence of a flow control valve (not shown) to cause the cutter 36 (which is driven continuously in the operation of the device) to approach the holder 14 at station C and progressively cut away the projecting surplus portions S of the handle in thin slices. The small pieces of clay fall away into a suitable collector (not shown), the gaps 64, 66 allowing them to do so freely. As the blade 68 reaches the edge 20 of the holder 14 to complete the trimming operation, the movement of the motor is arrested by an adjustable stop screw (not shown) on the frame 11. The motor 40 then swings quickly back to its out-of-the-way position, the reversal of the cylinder 44 being initiated either in response to the automatic control of a timed valve or by initiation of a microswitch when the motor engages the aforementioned stop. The machine is now ready for initiation of another cycle, the handle H being brought to an intermediate station D and, in the next following cycle, to the unloading position at station A.

When, in using the illustrative device, the cutter 36 is rotating at 3,000 r.p.m., clean and accurate cutting of the surplus clay has been obtained without bringing the blade 62 right up to the edge 20 of the holder 14, but it is preferred that this edge 20 be of complementary shape to the cutter so that the device can be adjusted for close approach of the cutter if desired. The edge 20 is therefore preferably relieved to avoid fouling by the heads of the screws 69.

It is preferred to mount only one blade 68 on the cutter carrier 54, to avoid any complication in setting up the device if two, diametrically opposed, blades were used and were not precisely symmetrical about the centre axis. But the carrier itself is preferably symmetrical about its axis to avoid undue imbalance.

In carrying out the illustrative method using the illustrative device the attaching surface of the handle (the two parts of which are indicated at J and K at station D) are found to be in accurate conformity with the configuration of complementary portions of the cup bowl to which the handle is to be attached.

We claim:

1. A method of removing from a cup handle surplus clay in such a manner as to provide an attaching surface having a high degree of conformity to its intended shape comprising rotatably mounting a cutter blade on supporting portions of a carrier which are spaced apart to leave the blade unconfined along that part of its length which effects the cutting, contouring the unconfined part of said blade so that when rotated it defines by its arcuate path a shape to which it is desired the attaching surface of the handle to conform, mounting the handle in a holder from which the surplus clay projects, mounting the blade carrier so that its axis of rotation lies in a plane substantially parallel to the plane of said handle, rotating said carrier, causing relative lateral movement of approach between the handle and the rotational axis of the rotating cutter in such a manner as to remove the surplus clay progressively in small pieces in a plurality of separate cuts as said axis approaches the handle, and allowing said small pieces to escape between said carrier and the unconfined part of said blade.

2. A method according to claim 1 wherein said blade is contoured to represent the longitudinal profile of the bowl of a cup to which the handle is to be attached, the axis of rotation of said blade carrier representing the axis of the bowl of said cup, the relative lateral movement of approach between the handle and the rotational axis of the rotating cutter being such that the small pieces removed by said separate cuts are thin slices of said surplus clay.

3. A method according to claim 2 wherein the carrier rotates at not less than 3,000 revolutions per minute.

4. A handle-cutting device comprising a holder with a groove in it to receive and position a handle, the groove terminating at an edge of the holder over which surplus clay of a handle projects in the operation of the device, a carrier rotatable about an axis lying in a plane substantially parallel to the plane of said groove, a cutter blade mounted on supporting portions of said carrier which are spaced apart to leave the blade unconfined along that part of its length which effects the cutting, said blade being contoured such that when said carrier is rotated about its axis the cutting part of the blade defines by its arcuate path a shape to which it is desired the attaching surface of the handle shall conform, and means for causing relative lateral movement of approach and separation to take place between said axis of rotation of said carrier and the holder in the operation of the device, said means being arranged that in such relative lateral approach, the surplus clay of a handle is removed progressively in thin slices in a plurality of separate cuts with said slices escaping between said carrier and the unconfined part of said blade.

5. A device according to claim 4 comprising a conveyor on which a plurality of handle holders are mounted for step-by-step movement through a handle-cutting station where the cutter operates on the handle, and means at said station for lightly clamping the handle in the groove of each holder for the cutting operation.

6. A device according to claim 5 including a frame, said clamping means comprising a hold-down member pivoted on said frame, and cam means mounted on the conveyor and arranged to move said hold-down member into and out of operative engagement with the handles.

7. A device according to claim 5 wherein said conveyor is a rotatable horizontal table.

8. A device according to claim 5 wherein the carrier is mounted on the output shaft of an electric motor, means mounting said motor for movement causing said carrier and blade to approach a holder laterally at the handle-cutting station, and means for moving said motor so that said carrier and blade approach the handle-cutting station at a controlled speed.

9. A device according to claim 8 in which the mounting means mounts the motor for pivotal movement and said moving means comprises a pneumatic cylinder.

* * * * *